(No Model.)
W. H. TUFTS & L. ROTH.
REACH COUPLING FOR VEHICLES.
No. 261,069. Patented July 11, 1882.
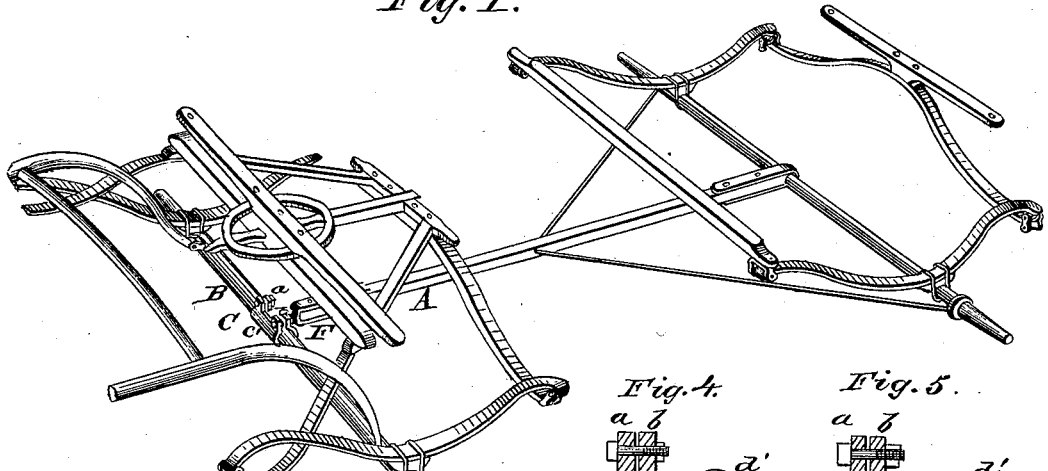
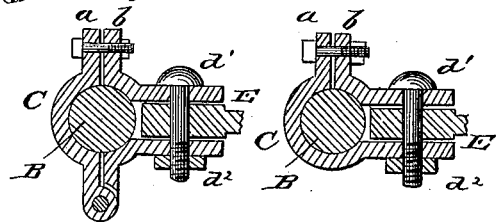
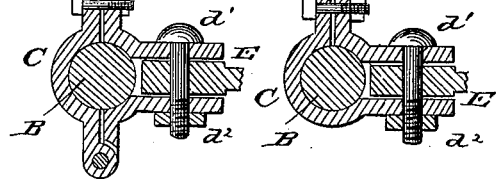
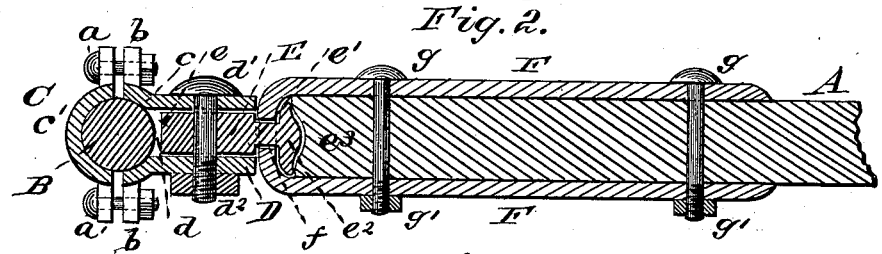
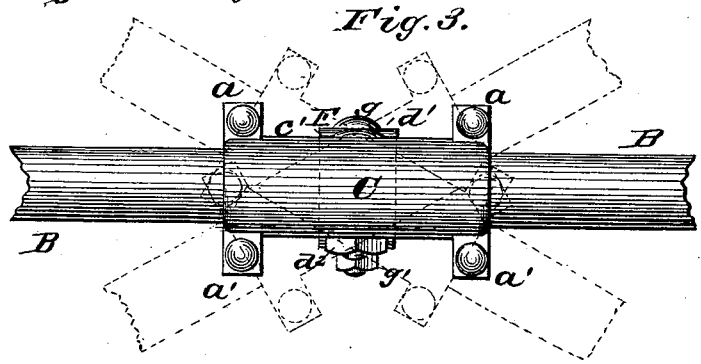
WITNESSES:
INVENTORS.

UNITED STATES PATENT OFFICE.

WILLIAM H. TUFTS AND LOUIS ROTH, OF ROME, NEW YORK, ASSIGNORS TO CYRUS D. PRESCOTT, OF SAME PLACE.

REACH-COUPLING FOR VEHICLES.

SPECIFICATION forming part of Letters Patent No. 261,069, dated July 11, 1882.

Application filed April 15, 1882. (No model.)

*To all whom it may concern:*

Be it known that we, WILLIAM H. TUFTS and LOUIS ROTH, citizens of the United States, residing at Rome, in the county of Oneida and State of New York, have invented certain new and useful Improvements in Devices for Coupling or Connecting the Reaches of Wagons to their Axles; and we do hereby declare the following to be a full, clear, and exact description of the invention, such as will enable others skilled in the art to which it appertains to make and use the same.

The connecting-poles or reaches of wagons and carriages are usually formed of a heavily-ironed single bar of wood, which is made rigid by numerous strong braces leading from it to the axle-trees of the wagon or carriage. The objection to this construction is that when the carriage or wagon is drawn over uneven roads the up-and-down movement of the wheels in passing over the irregularities in the road subjects the reach to great tortuous straining, which is apt to loosen and bend the braces, and often the reach is broken in this manner.

This invention relates to certain new and useful improvements in the class of couplings for connecting the reach with the forward axle-tree, whereby the usual king-bolt is dispensed with and the axle made stronger at the point of connection with the reach and given a free vertical movement at its ends, thus obviating all strains on the gearing and reach; and to this end the invention consists in novel features of construction and combination and arrangements of parts, all as will be hereinafter fully described, and set forth in the claims hereto annexed.

Referring to the accompanying drawings, which form a part of this specification, Figure 1 represents a view in perspective of the gear of a platform spring-wagon, showing the improved coupling as applied thereto for connecting the reach with the forward axle; Fig. 2, an enlarged vertical section of the coupling connecting the reach and axle; Fig. 3, a front end view, showing in plain lines the normal position of the axle and in dotted lines the positions it may assume in going over irregularities in the road without bringing any strain upon the reach. Figs. 4 and 5 are detail views, to be hereinafter referred to.

The several parts constituting the running gear of a platform spring-wagon being now in general use, it is only deemed necessary to describe such parts as constitute the principal subject-matter of the present invention.

In the drawings, A represents the reach, and B the forward axle. C represents a metallic clamp, formed in two half-sections, $c\ c'$, which when connected together form a circular, square, or other formed clamp corresponding with the contour of the axle at the point where it is applied, and which it completely encircles or embraces, and secured thereto by bolts and nuts $a\ a'$, passing through projecting slotted lugs $b$, formed or cast integral with said clamp, and said clamp might close on one side, so as to be sprung around the axle or hinged on one side, as shown in Figs. 5 and 4. The clamp C is provided at its rear side with a projecting casting, D, having a socket, $d$, for the reception of the semicircular portion or end $e$ of the coupling E, which is pivotally secured therein by a bolt, $d'$, passing down through a hole in said portion or end $e$ and the casting and secured by a nut, $d^2$, or riveted or screwed in. The coupling E has at its other end a circular portion, $e'$, which passes loosely through a hole, $f$, in the forward end of the metallic clip F, embracing the upper and lower sides of the reach at its front end, and said coupling is provided at its rear end with an enlarged portion or head, $e^2$, inside of said clip, by which the coupling is secured in position, said head $e^2$ playing in a recess, $e^3$, formed in the front end of the reach. The clip F is secured to the reach by bolts $g\ g$, passing down through it and the reach, or riveted thereon or otherwise fastened, and secured therein by nuts $g'\ g'$, all as clearly shown in Fig. 2.

By the above-described coupling the wrenching, twisting, and straining consequent upon one of the front wheels dropping into a rut or hollow in the road when the old method of gearing is used is entirely overcome, as the coupling pivots the axle to the reach so as to allow of a free vertical movement of the axle at either end, as shown in dotted lines, Fig. 3, and also the usual lateral play in turning, while the clamp C greatly strengthens the axle at its point of connection with the reach; also, the clamp C admits of readily removing the connection of the reach A from front axle and replacing the same without injury for all purposes of repair or otherwise.

This improved coupling, while allowing a much freer movement of the front axle and wheels, and other advantages above referred to, can be made much cheaper than the old style of gearing or connections, and wagons provided therewith will be much more enduring than by the usual method.

Having thus fully described our invention, what we claim as new, and desire to secure by Letters Patent, is—

1. The combination, with the axle B and reach A, of the connecting devices consisting of the clamp C, formed in two sections, tightly and completely embracing or covering the axle at point of connection therewith, and an intermediate double joint or hinge, substantially as herein shown and described, whereby the axle is strengthened and adapted to have free vertical and lateral movements without straining the reach, as specified.

2. The combination, with the axle B and reach A, of the connecting devices consisting of the clamp C, formed in two sections, $c\ c'$, having slotted lugs $b$ and securing bolts and nuts $a\ a$, casting D, provided with socket $d$, and coupling E, pivotally connected to one end in said casting D and provided at its other end with head $e^2$, connected to clip F, secured to the reach, the several parts constructed and arranged relatively to each other substantially in the manner as and for the purpose herein shown and specified.

In testimony whereof we affix our signatures in presence of two witnesses.

W. H. TUFTS.
LOUIS ROTH.

Witnesses:
C. D. PRESCOTT,
F. L. ROTH.